(12) United States Patent
Vikberg et al.

(10) Patent No.: US 8,305,960 B2
(45) Date of Patent: Nov. 6, 2012

(54) METHOD AND APPARATUS FOR REMOTE MONITORING OF FEMTO RADIO BASE STATIONS

(75) Inventors: Jari Vikberg, Jarna (SE); Tomas Nylander, Varmdo (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 609 days.

(21) Appl. No.: 12/300,134

(22) PCT Filed: May 30, 2006

(86) PCT No.: PCT/SE2006/050169
§ 371 (c)(1),
(2), (4) Date: Nov. 10, 2008

(87) PCT Pub. No.: WO2007/139460
PCT Pub. Date: Dec. 6, 2007

(65) Prior Publication Data
US 2009/0135737 A1    May 28, 2009

(51) Int. Cl.
*H04W 4/00* (2009.01)
(52) U.S. Cl. ........................................ 370/328
(58) Field of Classification Search .................. 370/310, 370/328, 241; 455/403, 435.1
See application file for complete search history.

(56) References Cited

U.S. PATENT DOCUMENTS

| | | | |
|---|---|---|---|
| 2003/0162539 A1* | 8/2003 | Fiut et al. ........................ | 455/424 |
| 2004/0204097 A1 | 10/2004 | Scheinert et al. | |
| 2005/0014492 A1 | 1/2005 | Kang et al. | |
| 2005/0130662 A1 | 6/2005 | Murai | |
| 2005/0259591 A1* | 11/2005 | Moore et al. ................... | 370/252 |

(Continued)

FOREIGN PATENT DOCUMENTS

JP    2005175900 A    6/2005

(Continued)

OTHER PUBLICATIONS

Japanese language version of First Office Action issued Feb. 3, 2012, for corresponding Japanese Patent Application No. 2009-513092, and letter dated Apr. 3, 2012 from Japanese associate regarding First Office Action issued Feb. 3, 2012, 7 pages.

*Primary Examiner* — Man Phan
*Assistant Examiner* — Kevin Lee
(74) *Attorney, Agent, or Firm* — Rothwell, Figg, Ernst & Manbeck, P.C.

(57) ABSTRACT

The present invention describes a method for operation and maintenance of Access Points in a wireless communications network, and a network node and an access point for use in such a network. Access points are used for connecting wireless networks to core networks. The method comprises the step of first receiving, at a network node, an on-demand triggered request for status information, wherein the request includes an access point identity. The network node investigates, using the received access point identity, if the access point is registered within the network. If the access point is registered within the network, then as a first following step, the network node uses the access point identity to retrieving access point address information from storing means. In a second following step, the network node uses the retrieved address information to establish a connection to the access point. Thereafter the network node receives access point status information. As a last step, a response including the access point status information is sent to an end user.

15 Claims, 6 Drawing Sheets

U.S. PATENT DOCUMENTS

| | | |
|---|---|---|
| 2006/0068712 A1 | 3/2006 | Kroboth et al. |
| 2007/0060133 A1* | 3/2007 | Spitzer et al. ................. 455/445 |
| 2007/0070938 A1* | 3/2007 | Hori et al. ..................... 370/328 |
| 2007/0115950 A1* | 5/2007 | Karaoguz et al. ............. 370/356 |
| 2008/0318596 A1* | 12/2008 | Tenny ........................ 455/456.2 |

FOREIGN PATENT DOCUMENTS

| | | |
|---|---|---|
| JP | 2006094481 A | 4/2006 |
| WO | 9922541 A1 | 5/1999 |
| WO | 9935800 A2 | 7/1999 |
| WO | WO 2005125249 A1 | 12/2005 |

* cited by examiner

METHOD AND APPARATUS FOR REMOTE MONITORING OF FEMTO RADIO BASE STATIONS

CROSS REFERENCE TO RELATED APPLICATION

This application is a 35 U.S.C. § 371 National Phase Application from PCT/SE2006/050169, filed May 30, 2006, and designating the United States.

TECHNICAL FIELD

The present invention relates to a wireless communications network, and more particularly, to a method and apparatus for operation and maintenance of access points in a wireless communications network.

BACKGROUND

The present invention relates to wireless communications networks. In such networks, a geographical area to be covered by the network is divided into cells each having a node. In existing networks the nodes are represented by Radio base stations (RBSs), or Node-B as called in 3GPP specifications. Communications to and from a mobile terminal in a cell take place via a node over one or more frequency channels allocated to the cell. A Radio Base Station (RBS) in a wideband code division multiple access network (WCDMA), is a part of a Radio Access Network (RAN).

Cells may be of different types. For example macro cells are used in a network to provide large area coverage. Micro cells are deployed in many networks to increase capacity. Within one macro cell coverage area there maybe one or more micro cells.

Hierarchical cellular communications systems employ different size cells to provide both wide-coverage, basic-service (macro cell) and high-quality, high-capacity radio coverage in smaller areas (micro cells). Micro cells are useful in specific areas. For example, micro cells may be located to serve areas of concentrated traffic within the macro cell or to provide a high data rate service. A micro cell uses a low-height antenna and a low base station transmit power which result in a small cell and a short frequency reuse distance, thereby increasing capacity. Additional benefits of a smaller cell include a longer talk-time (battery life time) for users since mobile stations will likely use a substantially lower uplink transmit power to communicate with a micro cell radio base station (RBS) than with a base station in a larger macro cell which is likely farther away.

In a hierarchical cell structure (HCS), macro cells and micro cells typically overlap to handle different traffic patterns or radio environments. A micro cell base station may be connected to a macro cell base station via digital transmission lines, or the micro cell base station may be treated just like a macro cell and be connected directly to a base station controller node. Such control nodes are a base station controller (BSC), in the well-known global system for mobile communications (GSM) systems, or a radio network controller (RNC), in the third generation, wideband code division multiple access (WCDMA) systems. For more information concerning Macro cells and Micro cells see WO2005057975, hereby incorporated by reference.

If adjacent cells have a common frequency channel, a terminal crossing a cell boundary will undergo what is called a "soft" handover from a cell to another, i.e. the terminal continues to use the same frequency band. A handover which requires a change in frequency is called a "hard" handover.

In wireless networks of today there is an operation support system (OSS) or Operation and Maintenance (O&M). The OSS can be described as a network management system supporting a specific management function, such as fault, performance, security, configuration etc. The OSS is used for management of for instance macro Radio Base Stations or micro Radio base stations. Planning tools are used for radio network dimensioning.

FIG. 1 is a signal diagram illustrating a simplified view of management activities related to a procedure of adding another macro RBS to an existing WCDMA network.

1. Initially, adding of an RBS to a macro network is planned using a specific planning tool. This step can contain for example radio network planning activities and also transmission network activities. The latter involves how the RBS is connected to an Operation Support System (OSS) i.e. also this connectivity needs to be planned.
2. The RBS (or Node-B as called in 3GPP specifications) is initially configured with generic data. This data is common to all RBSs and one intention is to minimize configuration needed in a following step. This step can be performed already at the factory or at some other central location, before rolling out hardware.
3. Now the RBS is in a determined location where it will be installed. Any transmission needed for connections towards an RNC (and OSS) are manually defined in the RBS using some local configuration tool. This step may also include some configuration in the RNC and OSS nodes.
3a. The outcome of step 3 is that the RBS is connected to both the RNC and the OSS.
4. Some other local configuration of e.g. hardware is performed.
5. The RBS and the macro cell(s) it provides are configured and activated from the OSS.
   At this point the RBS is operational.
6. All O&M related to this RBS is performed using the connection established above in step 3. This includes Fault management e.g. alarm event and log handling, Configuration management e.g. software upgrades and Performance management e.g. Performance statistics.

Mobile communications networks are growing rapidly as new cells are introduced into the networks. Managing an increasing number of Base Stations (BSs), in a mobile communications network, is becoming a problem. A large number of RBSs will put high capacity requirements on the OSS. A large number of RBSs might also make it difficult for the OSS personnel to detect real problems in a RBS.

SUMMARY

An object of the present invention is to provide a new architecture of a wireless communications network and a method for operation and maintenance of access points in such a network.

In an embodiment of the invention there is described a method for operation and maintenance of Access Points in a wireless communications network. The access points are used for connecting wireless networks to a core network. The method comprises a first step of receiving, at a network node, an on-demand triggered request for access point status information. The request includes access point identity information. As a following step, the network node is responsible for investigating if the access point is registered within the network. This is performed using the received access point identity information. If the access point is registered within the network the access point address information is retrieved from a database and the address information is used for establishing a connection with the access point. The network node is then able to receive access point status information, which thereafter is used to send a response message.

In a further embodiment of the present invention the on-demand triggered requests for status information of an access point are initiated by an end user.

In another embodiment of the present invention there is described a network node for a wireless communications network having access points connecting wireless networks to a core network. The network node including a first receiver used for receiving an on-demand triggered request for access point status information. The request includes an access point identity used by investigating and retrieving equipment for investigating if the access point is already registered within the network. If the access point is registered within the network retrieving access point address information to be used by the connection establishing equipment for setting up a connection to the access point. A second receiver is used in the network node for receiving access point status information. The status of the access point is thereafter forwarded as a response to the on-demand triggered request.

In yet another embodiment of the invention there is described an access point connecting a small area wireless communication network, also called a Femto cell, to a core network. The connection is established via a Femto RNC, the RNC responsible for controlling Femto cells. The access point includes registration equipment used for sending registration messages to the Femto RNC for registering the access point. The registration is part of an initial start-up procedure. The access point further includes download equipment for downloading configuration data from the Femto RNC. Triggering equipment is used as part of the access point for activating on-demand triggered requests for status information concerning the access point. The requests also include access point identity information. A transmitter is included in the access point for transmitting requests to a network node, requesting the network node to perform on-demand status check-ups of the access point. The access point also includes a receiver used for receiving responses including access point status information.

DETAILED DESCRIPTION

An investigation is performed, by the present inventors, to find a possible way to provide homes or small areas with 3G coverage for a limited number of users using a small Radio base Station (RBS). This kind of small area radio base stations are here called Home 3G Access Points (H3GAPs) or Femto RBSs in some other contexts. A H3GAP is mainly targeted for private homes and small office segments and one benefit is that there is no need for alternative access technology investments or WLAN/UMA/GAN in handsets, since any existing 3G phones will work in such an environment. Examples of 3G standards are Wideband Code Division Code Multiple Access (WCDMA), CDMA2000 and Time Division—Synchronous Code Division Multiple Access (TD-SCDMA).

The invention described in this document is mostly relevant for a scenario using WCDMA, but it could also be applied in other cases. For example, a similar solution might be developed for GSM, CDMA2000 or TD-SCDMA. In the present description the WCDMA scenario is mostly used to achieve a more easy disclosure and better understanding of the present invention.

The H3GAPs provides normal WCDMA coverage for end users and is connected to an Radio Network Controller (RNC) using some kind of IP based transmission. A coverage area provided is called a Femto cell to indicate that the coverage area is relatively small compared with an area of a Macro cell. One alternative for the IP based transmission is to use Fixed Broadband access (like xDSL, Cable etc.) to connect the H3GAPs to the RNC. Another alternative would be to use Mobile Broadband access e.g. HSDPA and Enhanced Uplink. A H3GAP is installed and managed by end users in a plug-and-play manner which creates special needs for such a system.

In an embodiment of the present invention a method is described for performing operation and maintenance of a number of access points in a wireless communications network, wherein the number of access points is rapidly increasing.

In another embodiment of the present invention there is provided a method for performing operation and maintenance of a large number of access points wherein the access points are installed and controlled by end users.

Figure 1:
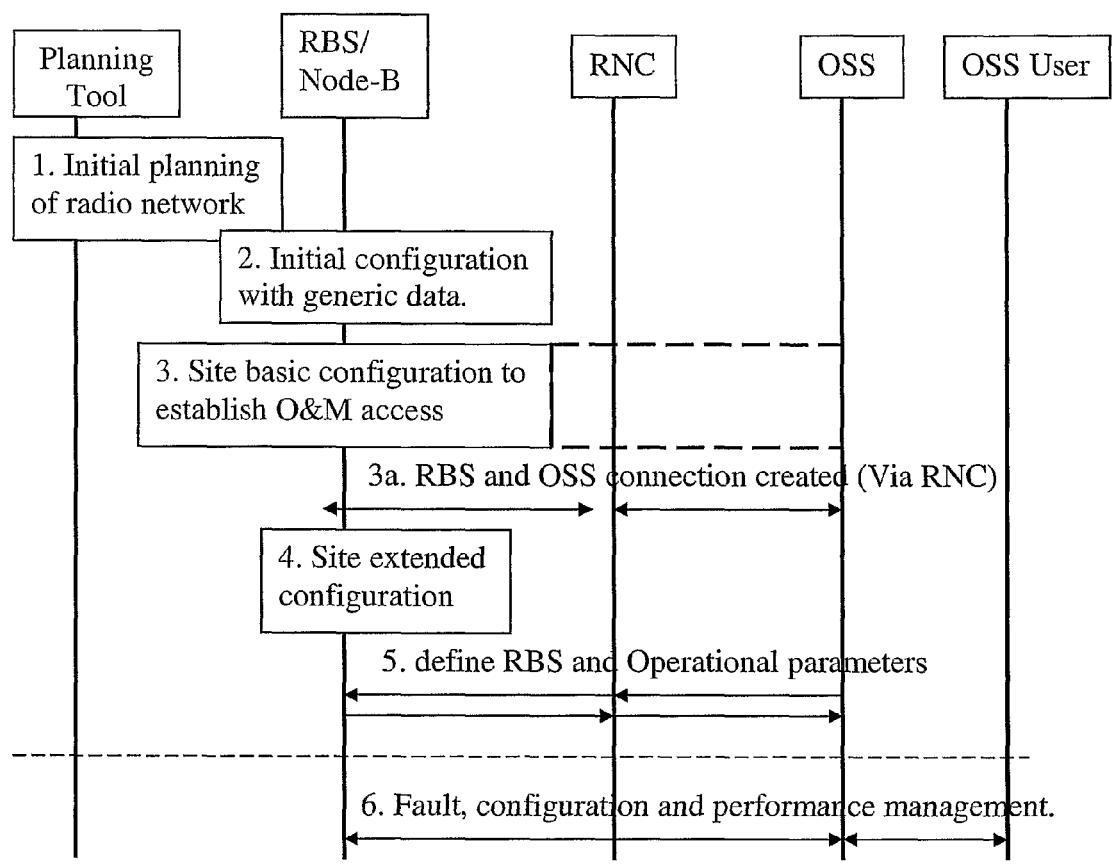
FIG. 1 is a signal diagram illustrating management activities related to prior art networks.
Figure 2:
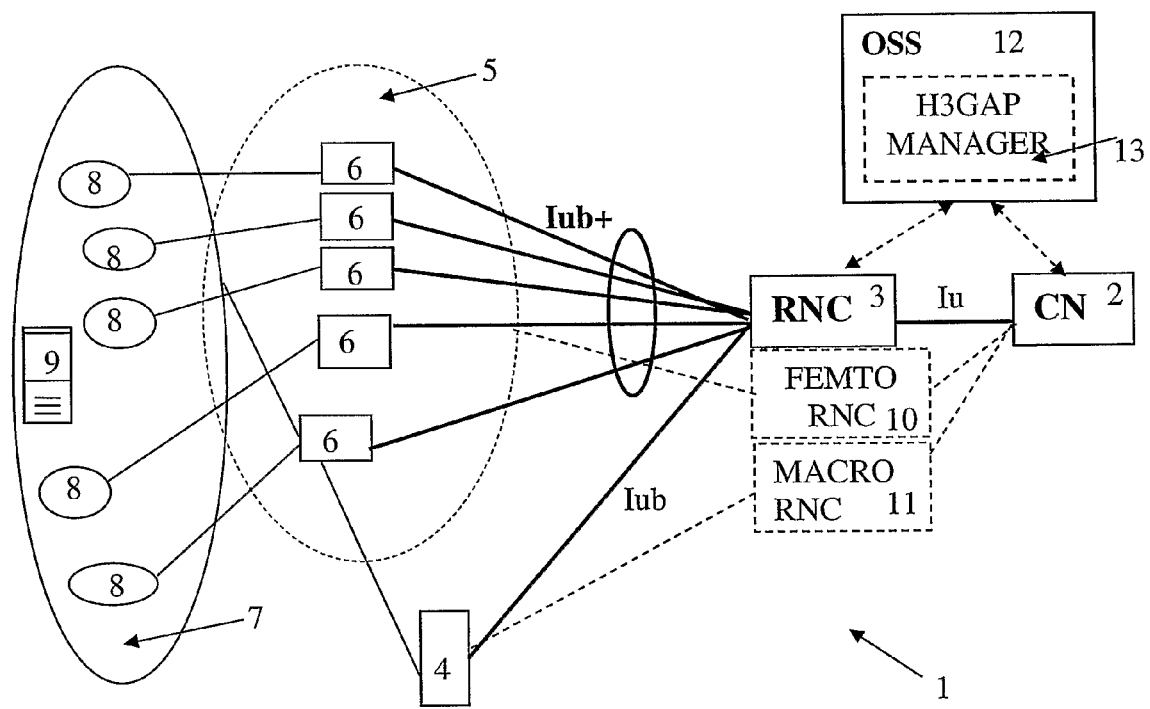
FIG. 2 is a block diagram illustrating an embodiment of the present invention.

FIG. 2 is a block diagram according to an embodiment of the invention illustrating a WCDMA network including Home 3G access points. The wireless communications network 1 includes a core network (CN) 2 connected to a radio network controller, RNC 3, using a standard Iu interface. Alternatively, the RNC is a Macro RNC and/or a Femto RNC. The RNC controls all Radio Base Stations that are connected to the RNC, both Macro and Femto Radio Base Stations. In the figure, the RNC 3 is connected to a Macro RBS 4 and to one or more H3GAP 6 belonging to a group of H3GAPs 5. The interface between the H3GAP and the RNC is a Iub+ interface or an Extended Iub interface, and is transported using an IP network providing IP connectivity between a H3GAP and the RNC. As this IP network may consists of unprotected IP networks, security mechanisms between the RNC and the H3GAPs are included. Communication between the RNC 3 and the Macro RBS 4 is IP based or IP/ATM based, and the interface is Iub. The Macro RBS 4 is working as an access point for one or more mobiles 9 within a macro cell 7. The group of H3GAPs 5 are working as access points for mobiles within Femto cells 8. The RNC 3 may also communicate with a H3GAP 6 via the Macro RBS 4. This way the H3GAP uses the Macro RBS as a wireless access point into the core network.

In another embodiment of the present invention the CN 2 might also be connected to two RNCs, a Macro 10 and a Femto RNC 11, dashed lines in the figure. The Macro RNC 10 controls Macro Radio Base Stations, Macro RBSs, and the Femto RNC controls Femto RBSs, H3GAPs, marked with dashed lines. The Macro RNC and the Femto RNC would exchange information concerning access points, if necessary. An OSS 12 usually performs management of access points, Macro RBSs. A H3GAP manager 13 is responsible for managing H3GAPs. The OSS and the H3GAP manager can be stand alone nodes or parts of other nodes like the RNC 3 or the CN 2. The OSS and the H3GAP manager might also be distributed programs in a network 1.

Management of a H3GAP differs from management of Macro RBSs (RBSs covering big areas, Macro cells). Macro RBSs are normally connected to an OSS where an active supervision of a Macro RBS is performed. Some main differences between management of H3GAPs and Macro RBSs are the following:

- H3GAPs are installed, moved, maintained and switched-on/off by end users compared to operator personnel, which performs these activities for Macro RBSs.
- Management of H3GAPs is not normally planned by operator personnel.
- The number of installed H3GAPs is in many cases at least a couple of magnitudes higher than the number of installed Macro RBSs.

The H3GAPs could be for example automatically connected to an OSS as part of a power-on sequence to decrease configuration of for instance Operation and Maintenance (O&M).

Ss end users are in control of the H3GAPs, it is highly undesirable that an event or alarm is triggered in the OSS, for example in cases when end users need power outlets for some other devices and so switch off the H3GAPs for a while, or if a related fuse has blown or some other end user related reason. There are many end user related alarm events that might occur and result in significantly increased unnecessary signalling overloading the OSS.

A large number of H3GAPs could put high capacity requirements on an OSS, if the OSS actively is monitoring H3GAPs, since signalling of information and alarm events between H3GAPs and the OSS would become too high. The large number might also make it difficult for OSS personnel to see real problems in a specific H3GAP belonging to the large number of H3GAPs.

Thus, the present inventors realizing that there will be problems with performing O&M n a large number of H3GAPs, in the new proposed H3G system, therefore suggest the solution according to the present invention to avoid or at least alleviate such problems. An embodiment of the present invention is to make it possible to perform O&M on such a system.

Figure 3:
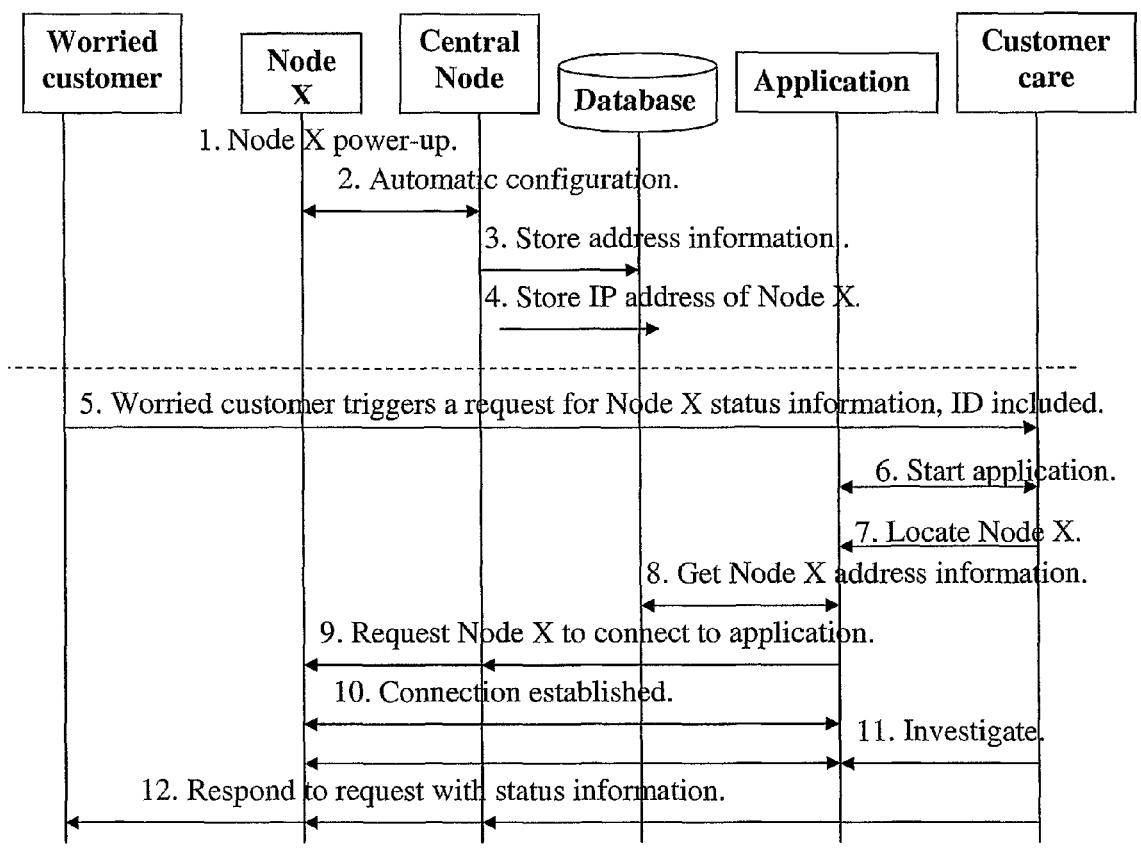
FIG. 3 is a signal diagram illustrating an embodiment of the present invention for performing management activities.

FIG. 3 is a signal diagram illustrating an embodiment of the present invention for performing management activities in a communications network including a large number of access points. The signal diagram illustrates the following steps:

1. A "Node X" is initially powered up. The Node X can be any type of node providing communication services for mobiles or mobile devices in a coverage cell. When powered up, the Node X performs defined power up activities for this node type, which are predefined and set by a node provider. As part of the power up, the Node X either dynamically builds an identifier for a controlling Network Central Node, or the Node X is already preconfigured with information concerning a Central Node.
2. The Node X is preferably automatically configured. This step could be coordinated by a Central Node, which then chooses specific configuration settings to be used by an access point, Node X, which is controlled by the Central Node. Alternatively, this step could be done locally in an access point. In both cases the Node X shall connect to the Central Node and provide its address information to the Central Node.

Depending on the steps below, the connection between the Node X and the Central Node is maintained as long as the Node X is active, or this connection can be released after the initial power up procedure.

3. The Central Node updates a Database with information concerning to which Central Node the Node X is connected to. Some identifiers that uniquely identify the nodes are used for both the Node X and the Central Node.
4. Alternatively to point 3), the Central Node updates a Database with Node X IP address information.
5. A worried customer having problems with an access point, Node X, calls to an operator's customer care service and requests Node X status information. The request includes Node X identification information. Requests can be triggered in many ways for example: a button on the Node X; a short message service (SMS) to an operator; an SMS to a Central Node; an e-mail etc.
6. An application is activated, in this case by the customer care, after receiving the request, for Node X management.
7. The identifiers in the request are used to locate Node X. The customer care provides the identifiers to the activated application.
8. The application retrieves Node X address information from the Database using the identifiers provided by customer care.
9. The application initiates connection establishment to the Node X using two different alternatives.

If Central Node information is used for identifying the location of Node X, i.e. step 3 above, the application contacts the indicated Central Node and requests it to relay the connection request to the correct node, Node X. This could be part of an existing interface between the central Node and Node X.

If node X address information is used (i.e. step 4 above), the application contacts the indicated Node X directly using the IP address information and sends a connection request directly to Node X. The address information of Node X needs to be routable from the application. There are different mechanisms to achieve this. One would be e.g. using an IP security (IPsec) connection between the Node X and an Security GateWay (SEGW) placed close to the Central Node. In this case it would be secure to have the Node X listening on a specific (e.g. TCP) port for incoming connection requests from the application. Another alternative would be to use public, routable address/es that are either configured in the Node X or communicated during the power-up procedure.

10. A connection is established between the Node X and the application.
11. Status information of Node X is investigated. Informative logs available are read out from the Node X, and received at the application.
12. A response is sent back to the end user, the response including Node X status information. The response might be sent in many ways like for example: directly to an end-user mobile terminal; as an e-mail to a computer in connection with Node X; as a message to be presented on a small display on the Node X; an SMS; direct call from an operator etc.

In another embodiment of the present invention the application, the database and an electronic customer care program are parts that are located within the Central Node. Thus, the Central Node is a node performing all the controlling steps mentioned above and needed for performing operation and maintenance of an access point, Node X.

In another embodiment of the present invention the application, the database and the electronic customer care program are distributed programs within the core network. The electronic customer care program is a program that is triggered by means of a specific request message addressed directly to the electronic customer care program. The request message is included with specific parts that are needed to start-up/trigger an application.

Figure 4:
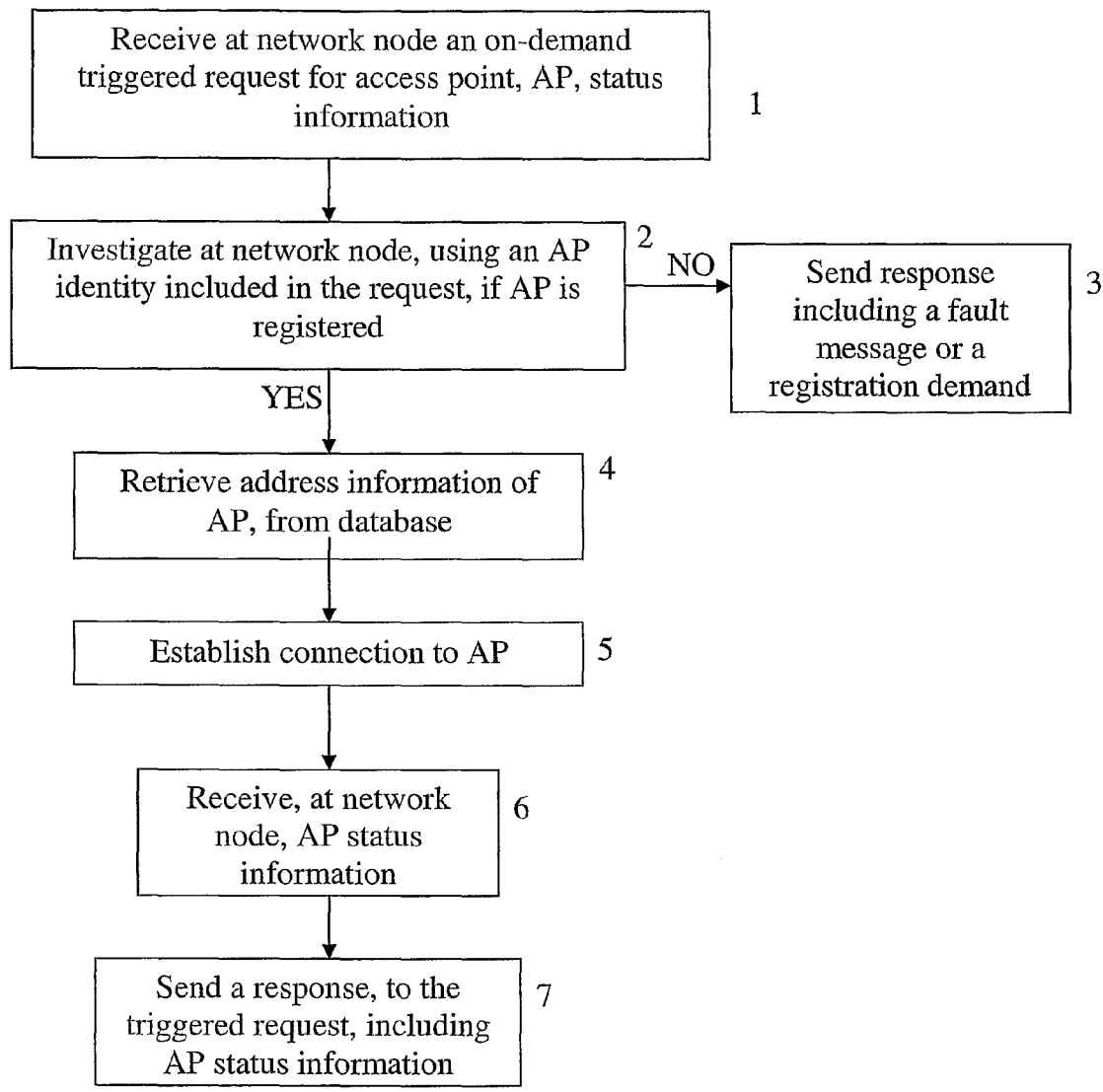
FIG. 4 is a flowchart illustrating a method according to an embodiment of the present invention.

FIG. 4 is a flowchart illustrating an embodiment of the present invention, wherein a network node includes all means for performing operation and maintenance of an access point. The network node might be centrally located in the wireless communications network as a stand alone node, or the network node can exist as a part of the RNC 3, the CN 2, the OSS 12 and the H3GAP Manager 13. The functionality of the network node might also be distributed among the network nodes in the wireless communications network. The flowchart illustrates the following steps:

1. Receiving, at a network node of a core network, an on-demand triggered request for access point status information, wherein the request includes access point identity information.
2. Investigating by the network node, using the received access point identity information, if the access point is registered within the network. A request is sent to a database where a matching procedure can be performed to find registration information. The investigation can be initiated by starting an application.
3. If the access point is not registered within the network, this means that there is no address to be found, the network node sends a response including a fault message or a registration demand. Alternatively, no response is sent at all.
4. If the access point is registered within the network, an address found, the network node uses the access point identity information to retrieve access point address information from the databases.
5. The network node uses the retrieved access point address information to establish a connection to the access point. The connection might be setup directly to the access point using an IP address of the access point, or the connection might be setup via another node, for example via an RNC.
6. Investigation of the status is performed and status information is received at the network node.
7. The network node sends a response, to the on-demand triggered request, including the access point status information.

Figure 5:
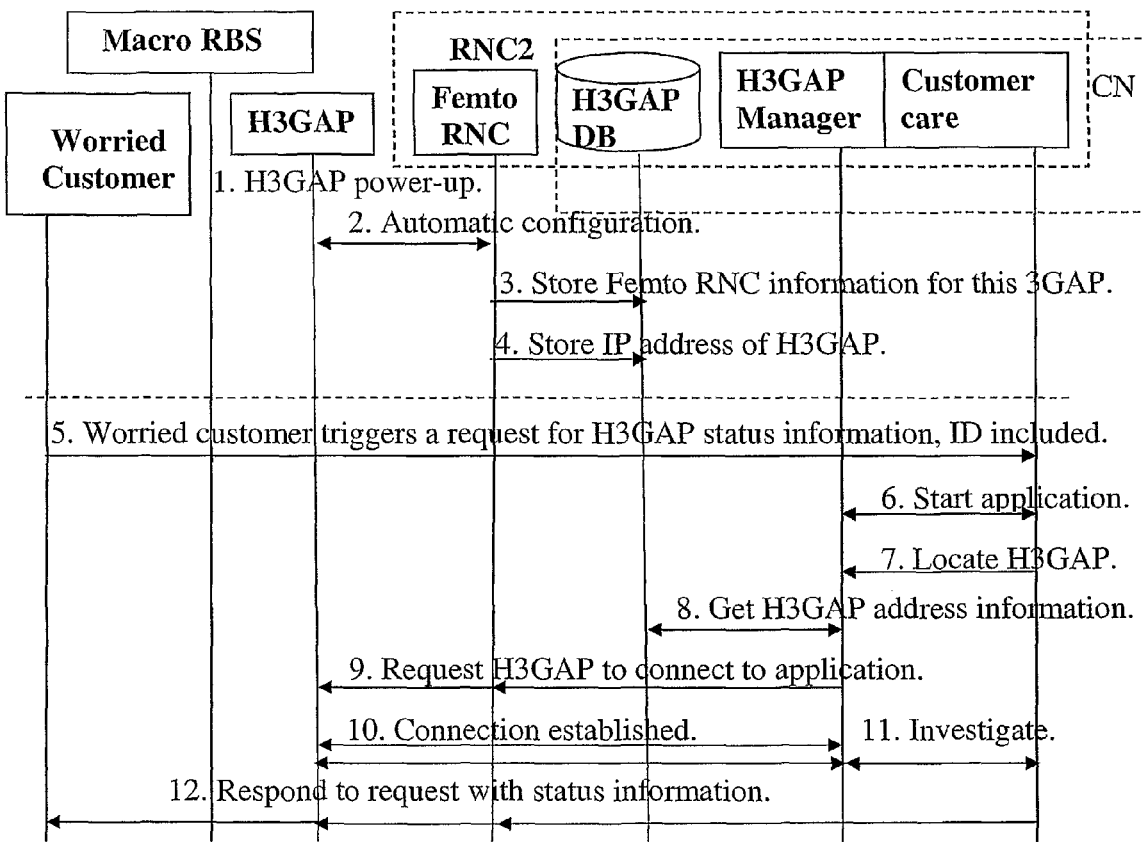
FIG. 5 is a signal diagram illustrating another embodiment of the present invention for performing management activities.

With reference to FIG. 5, another embodiment of the present invention is disclosed where the access point is a Femto Radio Base Station, Femto RBS, also called home 3G access point (H3GAP). The home 3G access point is connected to a core network via a Femto Radio Network Controller, Femto RNC. The H3GAP, upon powered up, automatically registers with a Femto Radio Network Controller, and downloads configuration data. This means that all H3GAPs are supposed to be registered within the network when an on-demand request is triggered. The connections between the access points and the Femto Radio Network Controllers, Femto RNCs, are IP based connections, and the access point identity is an IP address or an address of a Femto RNC controlling the access point. The communications network is a WCDMA network. The network node is an Operation Support System node, a modified RNC, a H3GAP manager or distributed program in the core network.

In the following example, the support system for H3GAPs is a H3GAP Manager. The H3GAP Manager could be either a standalone system or integrated in an existing support system. The present invention also comprises a logical network entity called Home 3G Access Database (H3GA DB) is introduced. This entity is a database where information regarding H3GAPs is stored and it could be a standalone system or integrated in for example an OSS or an RNC node.

The H3GAP is identified using a preconfigured H3GAP Identity (H3GAP-ID), preferably a hardware identity. The H3GAP-ID is also made visible for the end users.

The following principles and requirements could be applied for the H3GAP Manager:

a. Each H3GAP is identified by a H3GAP-ID. The H3GAP Manager can be aware of all possible H3GAP-ID values on the market and/or the end user will provide this information when he/she calls to the customer care services
b. The H3GAPs are not continuously monitored at the H3GAP Manager. Instead, it is possible to request each H3GAP to connect to the H3GAP Manager on demand or have the H3GAP Manager to connect to the H3GAP when needed. This principle is called O&M-on-demand in the present disclosure.
c. It is possible to read out relevant statistics, alarms, error reports and logs from a H3GAP using the "O&M-on-demand" principle.
d. It is possible to read and set relevant operation parameters from a H3GAP using the "O&M-on-demand" principle.
e. It is possible to read out contents defined in the H3GA DB for a specific H3GAP. For example, if access control has been defined for an H3GAP, both International Mobile Subscriber Identity (IMSI) and Mobile Station International ISDN Number (MSISDN) information shall be made available, whenever possible. This information is preferably also available in the H3GAP Manager and this is done using the "O&M-on-demand" principle.
f. As the H3GAP is not continuously connected to the H3GAP Manager, alarms and error reports are sent to the H3GAP Manager only if requested, based on the "O&M-on-demand" principle.
g. H3GAP Software (SW) should be upgradeable from the H3GAP Manager. It is also necessary to define some kind of batch upgrades of multiple H3GAPs defined by e.g. a specific actual SW release or specific ranges of H3GAP-IDs.

FIG. 5 is a signal diagram illustrating an embodiment of the present invention, as mentioned above, for performing management activities. The signal diagram illustrates the following step:

1. Initially, an H3GAP is switched on and it performs defined power up activities.
2. The H3GAP is connected to a Femto RNC and is automatically configured.
3. The Femto RNC updates a H3GA DB with information about to which Femto RNC the H3GA? is connected to. H3GAP-ID and Femto RNC Identifiers are used.
4. Alternatively to point 3), the Femto RNC updates the H3GA DB with H3GAP IP address information.
5. A worried customer has problems with an H3GAP and contacts an operator's customer care. The customer provides the H3GAP-ID as an identifier for the H3GAP. The customer care might be an electronic program receiving a specific message, wherein the message includes some predefined parts and information for automatically triggering an application to run. Another alternative is that the customer care is a person being called by an end user.

Another alternative for a worried customer for calling to a customer care service is as follows. The H3GAP is equipped with e.g. a button that can be used by the worried customers to trigger "Automatic H3GAP O&M".

When the end user pushes this button, the H3GAP contacts the H3GAP Manager directly. Address information of the H3GAP Manager can either be preconfigured in the H3GAP or the address information can be signalled to a H3GAP during the automatic configuration phase, i.e. step 2 above.

Instead of a H3GAP contacting a H3GAP Manager directly, the H3GAP could contact a Femto RNC which in turn knows the address of the H3GAP manager or is probably already connected to it. This could be done by sending e.g. a new NBAP (Node B application part) message "CONNECTION REQUEST TO ELEMENT MANAGER" for the H3GAP to the Femto RNC.

6. A worker at the operator's customer care service starts the H3GAP Manager application. Alternatively the application is automatically triggered.
7. The H3GAP-ID provided by the end user is used to locate the H3GAP and request a connection to it.
8. H3GAP Manager retrieves relevant Femto RNC information or IP address information for the H3GAP.
9. If Femto RNC information is used, the H3GAP Manager contacts the indicated Femto RNC and requests it to relay the connection request to the correct H3GAP. This latter step would be part of an "Extended Iub"-interface.

If H3GAP IP address information is used, the H3GAP Manager contacts the indicated H3GAP directly using the IP address information and sends a connection request to the H3GAP. As IPsec connection is used between the H3GAP and the SEGW, it should also be secure to have the H3GAP listening on a specific (e.g. TCP) port for incoming connection requests from the H3GAP Manager.

10. A connection is established between the H3GAP and the H3GAP Manager.
11. The worker can investigate the status of the H3GAP and read out the informative logs available.
12. A response is sent back to the end user, for example via the Femto RNC, to a H3GAP display or directly to an end user terminal. The response includes H3GAP status information. The response might be sent in many ways like for example: directly to an end-user mobile terminal; as an e-mail to a computer in connection with the H3GAP, as a message to be presented on a small display on the H3GAP; an SMS; direct call from an operator using POTS etc.

A more detailed specification of step 9 in FIG. 5 is described below.

Step 9 can be defined in a more detailed way as following. Note that this only applies for the case when the Femto RNC information is used as defined in step 9 for FIG. 5, i.e. when the H3GAP Manager contacts the indicated Femto RNC and requests the indicated Femto RNC to relay the connection request to the correct H3GAP.

Requests sent from a Femto RNC to a H3GAP could be standardized as part of the "UTRAN Iub interface Node B Application Part (NBAP) signalling" specification (3GPP TS 25.433).

Messages added could be called for example "CONNECT TO ELEMENT MANAGER" and would contain needed address information, for example IP-address and TCP port, of the Element Manager.

In another embodiment of the present invention, messages "CONNECT TO ELEMENT MANAGER" don't contain any information elements and needed address information is signalled already in step 2, as part of the automatic configuration.

The H3GAP can start acting like a normal macro RBS when connected to the H3GAP manager e.g. send all new alarms and logs to the H3GAP Manager. In addition the H3GAP could start sending all stored logs to the H3GAP manager.

When the connection to the H3GAP is disconnected, the H3GAP should return to the previous mode of operation, e.g. storing alarms, counters and logs only locally.

Figure 6:
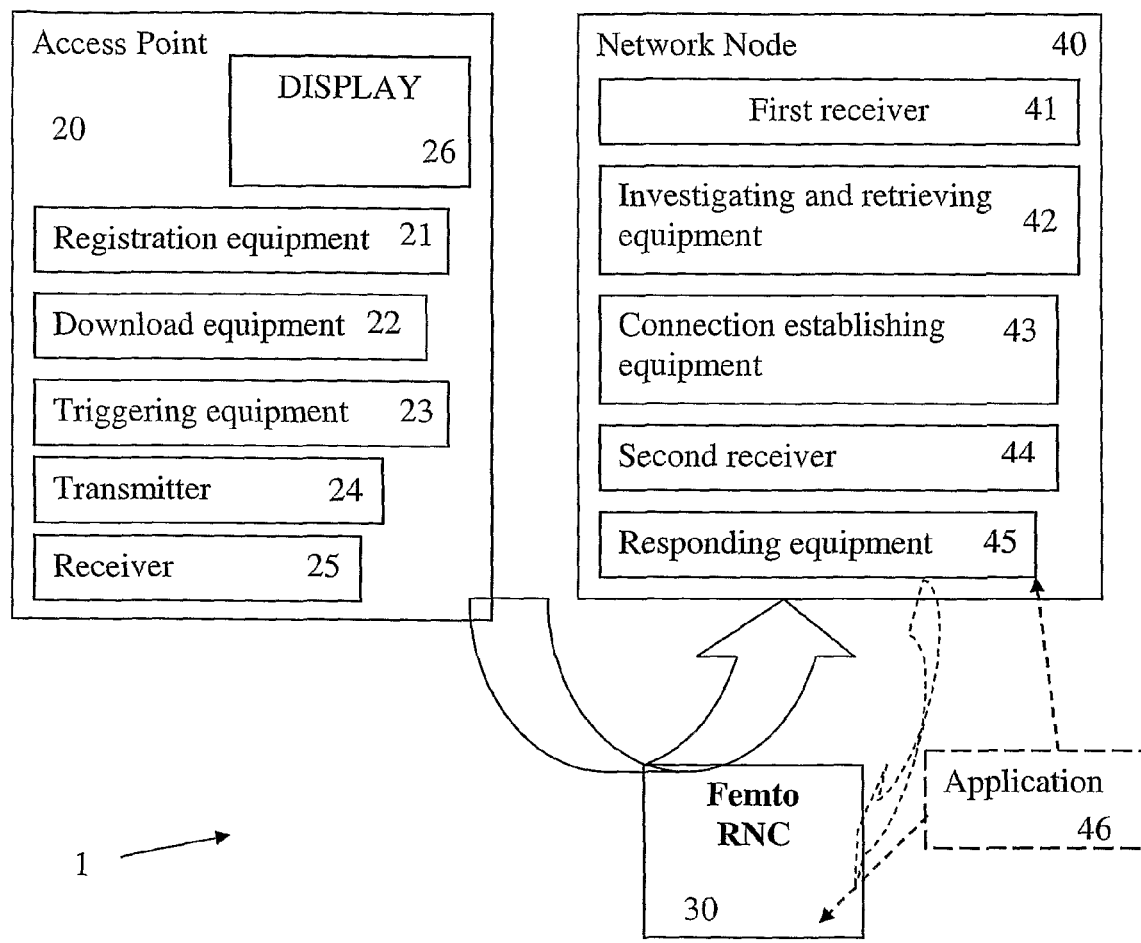
FIG. 6 is a block diagram illustrating an access point and a network node according to an embodiment of the present invention.

FIG. 6 is a block diagram illustrating an access point and a network node in accordance to an embodiment of the present invention. In a further embodiment of the invention the wireless communication network 1 includes access points and network nodes communicating with each other via RNCs. FIG. 6 shows only a simplified view of the network comprising only one access point, one RNC and one network node. In existing networks there are many access points controlled by one or more RNCs and managed by one or more network nodes.

An access point 20 according to FIG. 6, comprises registration equipment 21 for registering the access point 20, to a Femto Radio Network Controller 30, Femto RNC, upon an initial start-up. This might be performed automatically or triggered by an end user. The access point 20 further comprises download equipment 22 used for downloading configuration data from a Femto RNC 30, and Triggering equipment 23 used for activating on-demand triggered requests for status information concerning the access point 20, the requests including access point identity information. A transmitter 24 is used, in the access point 20, for transmitting the requests to a network node 40 requesting the network node 40 to perform on-demand status check-ups of the access point 20, and a receiver 25 is included for receiving responses, from a network node 40, sent in response to the on-demand triggered requests, the responses including access point status information.

The receiver 25 is also responsible for receiving messages from the Femto RNC 30 requesting the access point 20 to connect to an application 46, wherein the application performs the status check-up. The application 46 might be part of the Femto RNC 30, included in the Network Node 40 or included in the H3GAP Manager 13.

The message can be standardized as mentioned before, as a "CONNECT TO ELEMENT MANAGER"-message.

The access point might also be equipped with a display 26 for displaying status information, for example as messages. The display 26 can also be used to display information relating to actions to be taken by an end user.

The network node 40, in FIG. 6, manages several access points 5, as in FIG. 2. FIG. 6 shows only parts of the wireless communications network 1 needed to explain the present invention in a simple manner. The network node 40 comprises a first receiver 41 for receiving an on-demand triggered request for access point 20 status information, wherein the request includes an access point 20 identity. The network node 40 also comprises investigating and retrieving equipment 42 used for investigating if the access point 20 is already registered within the network 1. This is performed using the received access point identity. If the access point 20 is registered within the network 1 access point 20 address information is retrieved. A connection establishing equipment 43 is used for setting up connections to the access point 20. The connection is established based on the retrieved access point 20 address information. A second receiver 44 is included in the network node 40, for receiving access point 20 status information. The status information might be received directly from the access point 20 or from an application 46 performing status check-ups. Responding equipment 45 is responsible for sending a response message, back to the requester, wherein the messages include access point 20 status information. The response messages might be sent back to an end user on demand status requesting terminal or to a device address pre-stored in a database. The on-demand triggered request might also include information to which device and how the response is to be sent and presented.

It will be understood by those skilled in the art that various modifications and changes may be made to the present invention without departure from the scope thereof, which is defined by the appended claims.

The invention claimed is:

1. A method for operation and maintenance of small area access points in a wireless communications network, the access points connecting wireless networks to a core network, wherein the method comprises the following steps:
   (a) receiving a message, initiated by an end user of a small area access point, indicating that the end user may be experiencing a problem with the small area access point, the message including access point identity information associated with the small area access point;
   (b) investigating, using the received access point identity information, if the small area access point is registered within the network, and, if the small area access point is registered within the network, then performing the following steps:
      (b1) using the access point identity information to retrieve access point address information from a database;
      (b2) establishing a connection to the access point using the retrieved access point address information;
      (b3) after establishing the connection, receiving access point status information from the access point, and
      (b4) after receiving the access point status information, sending a response message to the end user.

2. The method according to claim 1, wherein, in case of the investigating step reveals that the small area access point is not registered within the network, then sending to the end user a fault message and/or an access point registering demand.

3. The method according to claim 1, wherein the response message includes at least some of the received access point status information.

4. The method according to claim 1, wherein the small area access point returns to a previous mode of operation in response to termination of the connection.

5. The method of claim 1, wherein the small area access point is a Femto Radio Base Station or a home 3G access point.

6. The method of claim 1, wherein the message indicating that the end user is experiencing a problem with the small area access point is received by a network node that is connected to an electronic customer care program.

7. The method of claim 6, wherein the network node is a Home 3G Access Point (H3GAP) manager, an Operation Support System node or a node including functions which might be distributed in the wireless communications network.

8. The method of claim 1, wherein the small area access point is connected to a core network via a Femto Radio Network Controller (RNC).

9. The method of claim 8, wherein the access point, upon power up, automatically registers with the Femto RNC that provides configuration data to the small area access point.

10. The method of claim 8, wherein the small area access point uses the Internet Protocol to communicate with the Femto RNC.

11. The method of claim 8, wherein the access point address information is an Internet Protocol (IP) address assigned to the small area access point or an address of the Femto RNC.

12. The method of claim 8, wherein requests sent from the Femto RNC to the small area access point are part of an extended Iub interface(Iub$_+$).

13. The method of claim 1, wherein the message indicating that the end user is experiencing a problem with the small area access point is transmitted in response to the end user making a phone call or sending a message to a network node, the end user using one of the following devices to make the phone call or send the message:
   a telephone,
   a computer, and
   the access point.

14. A network node for a wireless communications network, the wireless communications network having a small area access point for connecting a wireless network to a core network, wherein the network node comprises:
   a receiver for receiving an on-demand triggered request, wherein the on-demand triggered request includes access point identity information associated with the small area access point and wherein the on-demand triggered request was triggered by an action taken by an end-user of the small area access point;
   an investigating module configured to determine, using the received access point identity information, if the small area access point is a registered access point;
   a retrieving module configured to retrieve access point address information in response to the investigating module determining that the small area access point is a registered access point;
   a connection establishing module configured to set up a connection to the small area access point using the retrieved access point address information, wherein, after the connection establishing module sets up the connection to the small area access point, the receiver receives from the small area access point access point status information; and
   responding equipment for sending to the end user a response to the on-demand triggered request after the receiver receives the access point status information.

15. The network node of claim 14, wherein the network node is a stand alone node, a Home 3G Access Point (H3GAP) manager, a part of a Radio Network Controller, or a part of the Core Network.

* * * * *

UNITED STATES PATENT AND TRADEMARK OFFICE
CERTIFICATE OF CORRECTION

| | | |
|---|---|---|
| PATENT NO. | : 8,305,960 B2 | Page 1 of 1 |
| APPLICATION NO. | : 12/300134 | |
| DATED | : November 6, 2012 | |
| INVENTOR(S) | : Vikberg et al. | |

It is certified that error appears in the above-identified patent and that said Letters Patent is hereby corrected as shown below:

On the Title Page, Item (75), under "Inventors", in Column 1, Line 1, delete "Jarna" and insert -- Järna --, therefor.

On the Title Page, Item (75), under "Inventors", in Column 1, Line 2, delete "Varmdo" and insert -- Värmdö --, therefor.

In the Specifications

In Column 4, Line 18, delete "to an" and insert -- to a --, therefor.

In Column 4, Line 48, delete "a Iub+" and insert -- an Iub+ --, therefor.

In Column 6, Line 43, delete "and an" and insert -- and a --, therefor.

In Column 8, Line 14, delete "services" and insert -- services. --, therefor.

In Column 8, Line 52, delete "H3GA?" and insert -- H3GAP --, therefor.

In Column 9, Line 40, delete "H3GAP," and insert -- H3GAP; --. therefor.

In the Claims

In Column 11, Line 17, in Claim 1, delete "point ;" and insert -- point; --, therefor.

In Column 12, Line 12, in Claim 12, delete "interface(Iub$_+$)." and insert -- interface (Iub+). --, therefor.

Signed and Sealed this
Sixth Day of May, 2014

Michelle K. Lee
*Deputy Director of the United States Patent and Trademark Office*